US010173415B2

(12) United States Patent
Stewart

(10) Patent No.: US 10,173,415 B2
(45) Date of Patent: Jan. 8, 2019

(54) SYSTEMS AND METHODS FOR MONITORING OVERPRINT ORIENTATION

(71) Applicant: The Coca-Cola Company, Atlanta, GA (US)

(72) Inventor: Noel Stewart, Cumming, GA (US)

(73) Assignee: The Coca-Cola Company, Atlanta, GA (US)

( * ) Notice: Subject to any disclaimer, the term of this patent is extended or adjusted under 35 U.S.C. 154(b) by 64 days.

(21) Appl. No.: 15/327,760

(22) PCT Filed: Jul. 21, 2015

(86) PCT No.: PCT/US2015/041269
§ 371 (c)(1),
(2) Date: Jan. 20, 2017

(87) PCT Pub. No.: WO2016/014481
PCT Pub. Date: Jan. 28, 2016

(65) Prior Publication Data
US 2017/0210120 A1 Jul. 27, 2017

Related U.S. Application Data

(60) Provisional application No. 62/027,279, filed on Jul. 22, 2014, provisional application No. 62/073,125, filed on Oct. 31, 2014.

(51) Int. Cl.
*B32B 3/02* (2006.01)
*B41F 33/00* (2006.01)
*B41F 19/00* (2006.01)
*G09F 3/02* (2006.01)
*B41F 13/02* (2006.01)

(52) U.S. Cl.
CPC ........ *B41F 33/0081* (2013.01); *B41F 13/025* (2013.01); *B41F 19/007* (2013.01); *G09F 3/02* (2013.01); *B41M 2205/26* (2013.01); *B41P 2233/52* (2013.01); *G09F 2003/0201* (2013.01); *G09F 2003/0257* (2013.01)

(58) Field of Classification Search
CPC ...... B41F 19/007; B41F 33/0081; G09F 3/02; G09F 2003/0201; G09F 2003/0257
See application file for complete search history.

(56) References Cited

U.S. PATENT DOCUMENTS 4,426,898 A 1/1984 Friberg
5,752,776 A * 5/1998 Kunreuther ................ B41J 3/60 400/188
6,027,820 A 2/2000 O'Hagan et al.
(Continued)

FOREIGN PATENT DOCUMENTS

JP 2003025530 A 1/2003
WO 2014041085 A1 3/2014

*Primary Examiner* — Elizabeth E Mulvaney
(74) *Attorney, Agent, or Firm* — Eversheds Sutherland (US) LLP

(57) ABSTRACT

The present application provides an overprint orientation system. The overprint orientation system may include a first printer for printing on a substrate a first field and one or more orientation indicators within a second field, a second printer for overprinting the second field, and an orientation sensor. The orientation sensor determines whether the orientation indicators are visible.

20 Claims, 6 Drawing Sheets

(56) References Cited

U.S. PATENT DOCUMENTS

| | | | | |
|---|---|---|---|---|
| 6,108,672 | A * | 8/2000 | DeJoseph ............... | B41F 17/02<br>715/203 |
| 6,296,341 | B1 * | 10/2001 | Sugahara ............. | B41J 2/04573<br>347/11 |
| 6,354,693 | B1 | 3/2002 | Looman et al. | |
| 6,358,353 | B1 | 3/2002 | Maliner | |
| 6,594,374 | B1 * | 7/2003 | Beckstrom ....... | G07B 17/00508<br>382/101 |
| 7,225,738 | B2 | 6/2007 | Underwood et al. | |
| 7,511,622 | B2 | 3/2009 | Korzeniewski | |
| 2007/0279477 | A1 | 12/2007 | Iwasaki | |
| 2012/0236096 | A1 | 9/2012 | Roth et al. | |

* cited by examiner

SYSTEMS AND METHODS FOR MONITORING OVERPRINT ORIENTATION

TECHNICAL FIELD

The present application and the resultant patent relate generally to printing on any type of substrate and more particularly relate to monitoring the orientation of an overprinted field on substrates such as films and paperboard used for packaging and the like.

BACKGROUND OF THE INVENTION

Conventional printing techniques provide for the efficient high speed printing of packaging, labels, and the like used in, for example, consumer products and other types of goods. Production runs of millions of units are not uncommon. Generally described, conventional printing techniques such as a rotogravure process involve mechanically engraving a print roller with the desired image and then applying the print roller to a substrate. Such mechanical printing techniques provide high quality graphics and colors.

The use of digital printing techniques allows for a great variety in the production of the packaging and other types of printing because digital printing does not require the engraved print roller. Although digital printing is not as fast as conventional printing, digital printing allows for "on the fly" variations in production on any scale without requiring changes to the print rollers or other types of mechanical devices. Digital printing techniques thus may allow for inexpensive variations in packaging on, for example, a regional basis, an affiliation basis, a personal basis, or on any basis whatsoever.

There is a desire to combine the high speed capability of conventional mechanical printing techniques with the easy variations offered with digital printing techniques. Combining such techniques on a high speed basis, however, has proven to be somewhat difficult in that the respective print fields must be kept in orientation for an acceptable final product. In other words, the substrate must be carefully oriented after a conventional print run and before a digital "overprint" print run to ensure that the digital overprint is properly aligned.

There is thus a desire for systems and methods for monitoring proper overprint orientation. Specifically, the orientation of a digitally printed field with respect to a conventional mechanically printed field should be monitored during high speed production on any kind of substrate.

SUMMARY OF THE INVENTION

The present application and the resultant patent thus provide an overprint orientation system. The overprint orientation system may include a first printer for printing on a substrate a first field and one or more orientation indicators within a second field, a second printer for overprinting the second field, and an orientation sensor. The orientation sensor determines whether the one or more orientation indicators are visible or not.

The present application and the resultant patent further provide a method of monitoring overprint orientation on a substrate. The method may include the steps of printing a fixed field on the substrate, printing one or more orientation indicators in a blank field on the substrate, overprinting the blank field, and determining if the one or more orientation indicators are visible.

The present application and the resultant patent further provide an overprint orientation system for printing on a film or a printable or décor-able substance or other type of substrate. The overprint orientation system may include a mechanical printer for printing a fixed field and one or more orientation indicators within a blank field, a digital printer for overprinting the blank field to create a variable field, and an orientation sensor. The orientation sensor determines whether the one or more orientation indicators are visible such that a misaligned variable field may be determined herein.

The present application and the resultant patent further provide an overprint label. The overprint label may include a number of fields, an overwrap area adjacent to the fields, a first ink printed on a first field, an orientation indicator printed in the overlap area in the first ink, a second ink printed on the first field, and an eye mark printed in the overlap area in the second ink. The first ink and the second ink are properly aligned if the orientation indicator is not visible.

These and other features and improvements of the present application and the resultant patent will become apparent to one of ordinary skill in the art upon review of the following detailed description when taken in conjunction with the several drawings and the appended claims.

DETAILED DESCRIPTION

Figure 2:
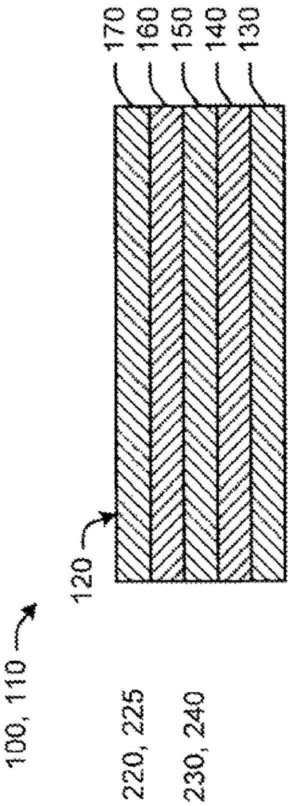
FIG. 2 is cross-sectional view of the overprinted label of FIG. 1.
Figure 1:
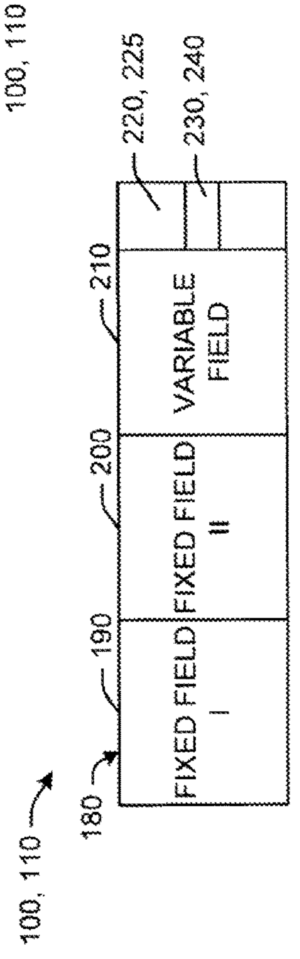
FIG. 1 is an illustration of an overprinted label.

Referring now to the drawings, in which like numerals refer to like elements throughout the several views, FIGS. 1 and 2 show an example of a substrate 100 as may be described herein. The substrate 100 may be made out of any material capable of accepting print thereon. In this example, the substrate 100 may be in the form of a label 110. The label 110 may have any suitable size, shape, or configuration. The label 110 may be used on a conventional beverage bottle or any other product or surface. The label 110 may be in the form of a multi-layer laminate 120. By way of example only, the laminate 120 may include a bottom film layer 130. The film layer 130 may be a clear or a tinted film made from oriented polypropylene or other types of thermoplastics and the like. A conventional ink layer 140 may be applied to the film layer 130. Any type of ink may be used herein. A primer layer 150 may be applied to the conventional ink layer 140. A digital overprint ink layer 160 may be applied to the primer layer 150. Again, any type of ink may be used herein. A top film layer 170 may be applied to the digital overprint ink layer 160. The layers and materials described herein are examples only. The layers may include any printable surface and may include any type of thermoplastics, paper, metal, fabrics, and the like. The inks may be any type of ink, coating, varnish, and the like. Other types of layers, materials, and/or techniques may be used herein without limitation.

The label 110 may have a number of fixed fields 180 for conventional mechanical printing thereon. In this example, a first fixed field 190 and a second fixed field 200 are shown. Any number of the fixed fields 180, however, may be used. The fixed fields 180 may be printed via the conventional ink layer 140 via conventional mechanical printing techniques. The first fixed field 190 may contain, for example, brand information and/or graphics. The second fixed field 200 may include, for example, legal or required information such as nutritional information as well as barcodes and the like. Any type of information, graphics, or other indicia may be used herein. The fixed fields 180 may have any suitable size, shape, or configuration.

The label 110 also may include any number of variable fields 210 for digital printing thereon. The variable fields 210 may be applied by the digital overprint ink layer 160 via digital printing techniques. The variable fields 210 may contain any type of information, graphics, or other indicia. Moreover, the variable fields 210 may change from label to label as desired during a production run of any scale. For example, a first label may be personalized for "Lynn," a second label may be personalized for "Andrew," a third label may be personalized for "Katy," and so forth. Likewise, a first group of labels may be intended for use in Georgia, a second group of labels may be intended for use in Texas, and so forth. The variable fields 210 may have any suitable size, shape, or configuration.

The label 110 also may include an overlap area 220 on one end 225 thereof or elsewhere. The overlap area 220 may include a slice indicator 230. As will be described in more detail below, the slice indicator 230 may trigger the operation of a cutter assembly and the like so as to slice an individual label from a continuous web of labels. The slice indicator 230 may have any suitable size, shape, or configuration. The slice indicator 230 may be made from, for example, an optical brightener 240. The optical brightener 240 may be, for example, a luminophor ink. The luminophor ink may reflect ultraviolet and/or visible light of a specific wavelength or a range thereof. Other types of reflective surfaces may be used herein. The slice indicator 230 may be any anything that may trigger the operation of the cutter assembly or other type of separation device. Although the slice indicator 230 is shown as being positioned on the edge 225 of the label 110, the slice indicator 230 may be positioned anywhere on the label 110 as long as the distance to the edge 225 is known and uniform.

Figure 3:
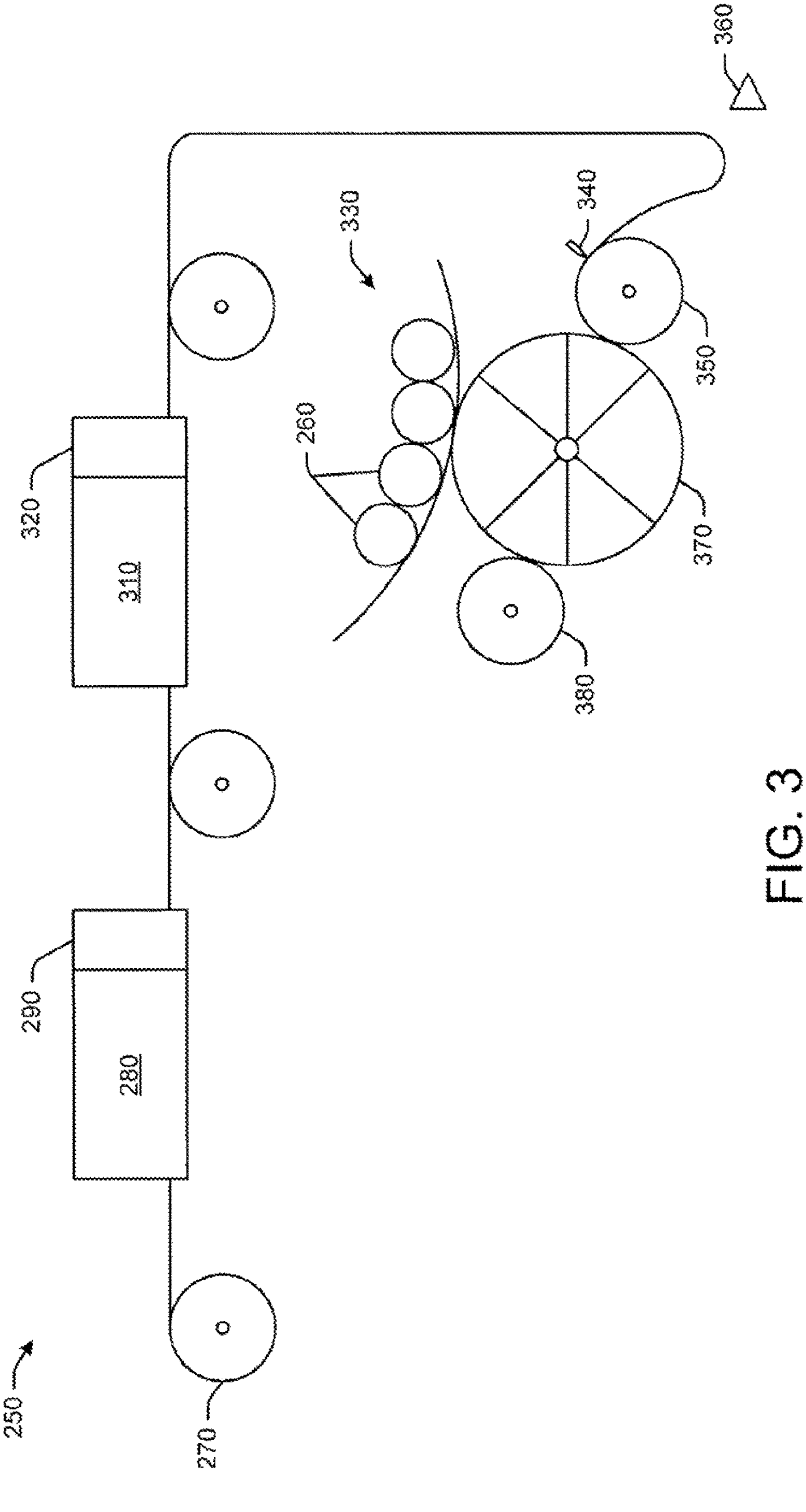
FIG. 3 is a schematic diagram of an example of a portion of a bottle labeling system.

FIG. 3 shows an example of a bottle labeling system 250. The bottle labeling system 250 may print and apply the labels 110 to a container such as a bottle 260 and the like. The film layer 130 may be stored on a continuous roll 270 or elsewhere. The film layer 130 may be fed into a conventional mechanical printer 280. The conventional mechanical printer 280 may provide, for example, nine color gravure print and the like. Other types of mechanical printers may be used herein. The conventional mechanical printer 280 applies the conventional ink layer 140 to the film layer 130. The conventional ink layer 140 creates the fixed fields 180 thereon. The primer layer 170 may be applied in a primer station 290 or elsewhere. A conventionally printed label base 300 thus is created.

The label base 300 may be stored and/or forwarded directly to a digital printer 310. The digital printer 310 may be of conventional design. The digital printer 310 applies the digital overprint ink layer 160 onto the label base 300. The digital overprint layer 150 creates the variable fields 210. The digital overprint ink layer 160 may be applied by one or more passes through the digital printer 310 or otherwise. The top film layer 170 then may be applied in a laminate station 320 or elsewhere.

The now finished label 110 may be stored and/or fed directly to a cutter assembly 330. The cutter assembly 330 may include a blade 340 positioned about a rotor 350. Operation of the blade 340 may be controlled by a slice sensor 360. The slice sensor 360 may emit an ultraviolet and/or a visible light of a given wavelength or range thereof. The slice sensor 360 detects a corresponding light emitted or reflected by the optical brightener 240 of the slice indicator 230 such that the location of the edge 225 of the label 110 is known. The slice sensor 360 may be any type of optical sensor, registration sensor, contrast sensor, luminescence sensor, color sensor, array sensor, and the like. The cutter assembly 330 also may include a vacuum pickoff 370 and a glue applicator 380. After being cut, the separated label 110 may be transported by the rotor 350 to the vacuum pickoff 370 and then to the glue applicator 380. The glued label then may be applied to one of the bottles 260. The bottle labeling system 250 described herein is for the purpose of example only. Many other types of labeling systems, printing systems, and components thereof may be known.

Figure 4:
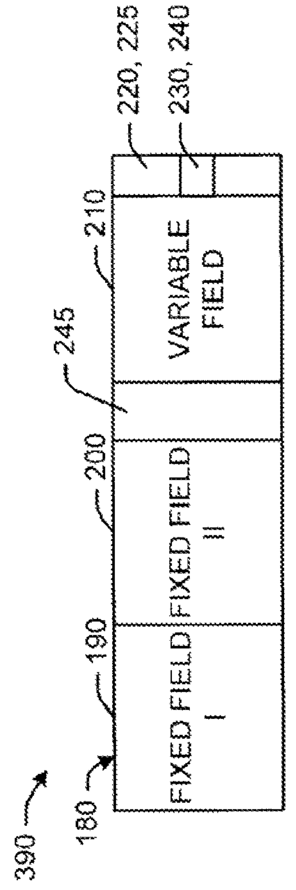
FIG. 4 is an illustration of a misaligned overprinted label.

FIG. 4 shows an example of a misaligned label 390. In this example, the print of the variable field 210 has drifted into the overlap area 220. As a result, a gap 395 exists between the fixed fields 180 and the variable field 210. The presence of the gap 395 thus results in an unacceptable label 110. Other types of misalignment may include the variable field 220 drifting in one direction or another, skewing at an angle, and/or the variable field may be missing in whole or in part. Given the high speed nature of the printing processes herein, a significant number of misaligned labels 390 may be produced before an error may be caught and corrected. The misaligned labels 390 thus may represent a significant loss of materials, time, and/or expense.

Figure 5:
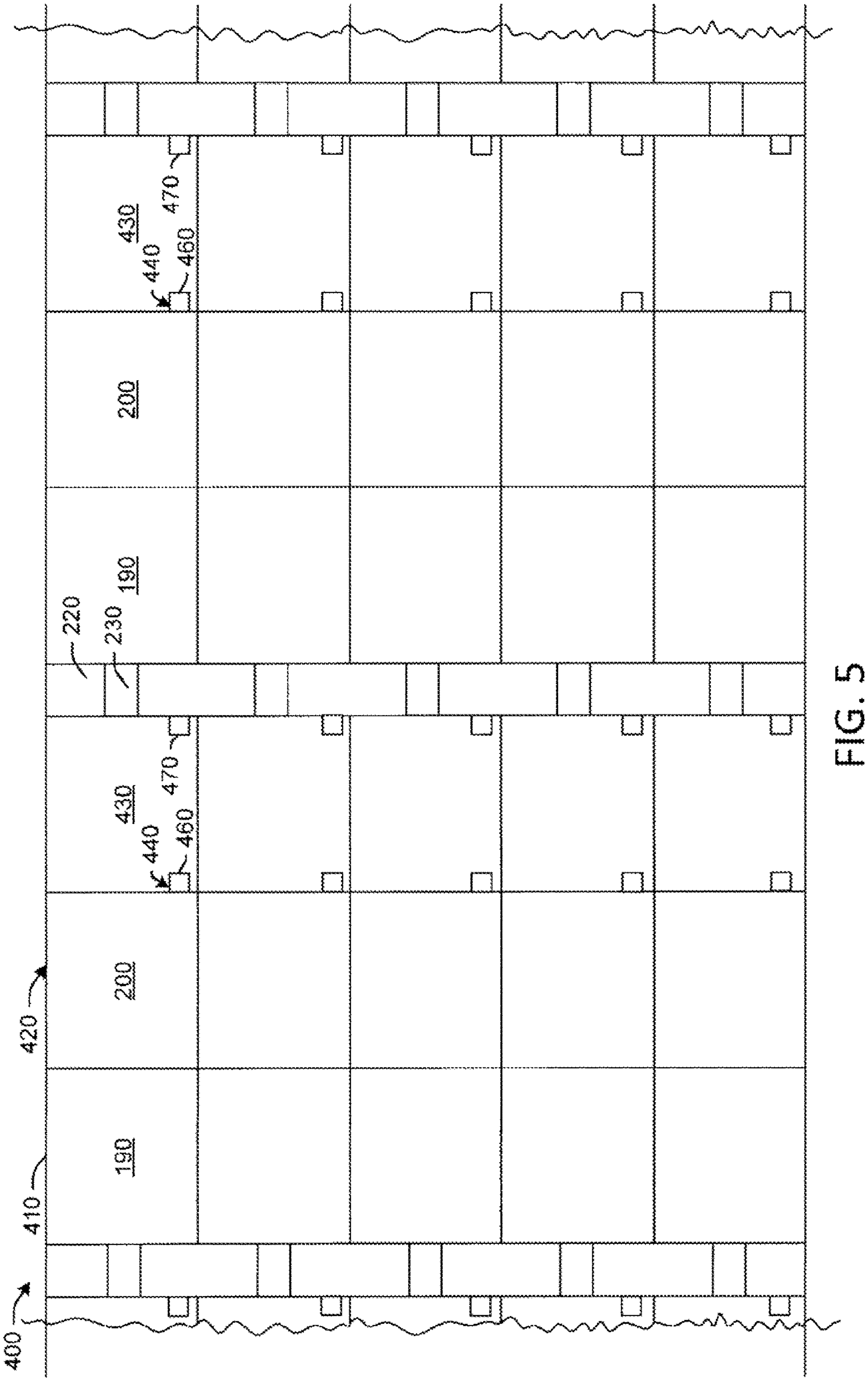
FIG. 5 is an illustration of an overprinted label base with the orientation indicators as may be described herein.
Figure 6:
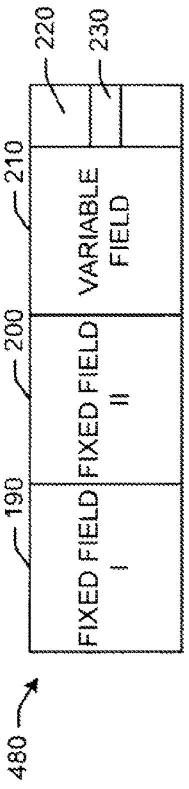
FIG. 6 is an illustration of an aligned overprinted label.
Figure 7:
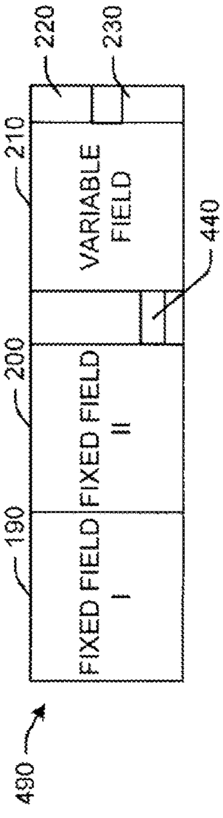
FIG. 7 is an illustration of a misaligned overprinted label with an orientation indicator visible.

FIGS. 5-7 show an example of an overprinted label 400 as may be described herein. The overprinted label 400 may be made from the same or a similar laminate 120 as used in the label 110 described above. Any type or combination of materials, however, may be used herein. As is shown, any number of the overprinted labels 400 may be positioned on a continuous web 410 of any dimension. The overprinted labels 400 also may include one or more of the fixed fields 180, one or more of the variable fields 210, an overlap area 220, and a slice indicator 230 similar to those described above. The overprinted labels 400 may have any suitable size, shape, or configuration.

FIG. 5 shows an example of a label base 420 of the overprint label 400. At this point, the conventional ink layer 140 has been applied to the film layer 130 or other substrate via the conventional mechanical printer 280. Likewise, the slice indicator 230 has been applied in the overlap area 220 via the conventional mechanical printer 280 or otherwise. The digital overlap ink layer 160, however, has not been applied to the variable fields 210 via the digital printer 310. Instead, one or more blank fields 430 thus are shown. (Although the term "blank field" is used, this field could represent any predetermined position on the label or other substrate.)

One or more orientation indicators 440 may be applied to the blank fields 430 or elsewhere. The orientation indicators 440 may have any size, shape, or configuration. In this example, a leading edge indicator 450 and a trailing edge indicator 460 are shown in each of the blank fields 430. The orientation indicators 440 may include the optical brightener 240. The optical brightener 240 may be made from a luminophor ink similar to that described above. The emitted light or reflected light may be ultraviolet light or light in the visible spectrum. The orientation indicators 440 may or may not emit or reflect light of a different wavelength as compared to the slice indicator 230. The orientation indicators 440 may be offset from the line of sight of the slice indicator 230. Any type of reflective material or surface may be used herein. Different types of orientation indicators 440 and/or different types of optical brighteners 240 also may be used to indicate respective positions across the continuous web 410 or otherwise. The orientation indicators 440 may be applied by the conventional mechanical printer 280 or otherwise.

The digital overprint ink layer 160 may then be applied to the blank fields 430 of the variable fields 210 via the digital printer 310. If the digital overprint ink layer 160 has been correctly applied and oriented, the orientation indicators 440 will not be visible as is shown in FIG. 6. If, however, the digital overprint ink layer 160 has been misapplied or oriented, a gap 470 may be present and hence at least one of the orientation indicators 440 may be visible. Visibility of an orientation indicator 440 thus indicates a misaligned label 480.

Figure 8:
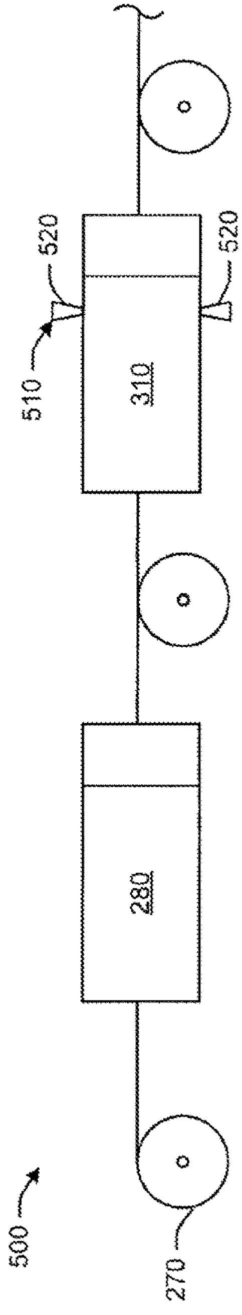
FIG. 8 is a schematic diagram of an example of an overprint labeling system as may be described herein.

FIG. 8 shows an overprint system 500 as may be described herein. The overprint system 500 may include the conventional mechanical printer 280 for applying the conventional ink layers 140 to the film layer 130 or other substrate. The overprint system 500 may include the digital printer 310 for applying the digital overprint ink layer 160. The overprint system 500 also may include an overprint orientation system 510. The overprint orientation system 510 includes the label bases 420 with the blank fields 430 and the orientation indicators 440 therein.

The overprint orientation system 510 also may include a number of orientation sensors 520. Similar to the slice sensor 360 of the cutter assembly 330 used to detect the position of the slice indicator 230, the orientation sensors 520 may emit a light of given wavelength or range thereof that in turn is reflected or emitted by the orientation indicators 440 if visible. The orientation sensors 520 may be any type of optical sensor, registration sensor, contrast sensor, luminescence sensor, color sensor, array sensor, and the like. Detection of the orientation indicators 440 by the orientation sensors 520 thus indicates a misaligned label 480. In response to the detection of a misaligned label 480, the overprint orientation system 510 may stop the production run, flag the misalignment, and/or take other suitable action. The orientation sensors 520 may be positioned anywhere along a production run downstream of the overprinting step. Any number of orientation sensors 520 may be used. Other types of detection devices may be used herein. For example, ultrasonic sensors could determine density as a trigger and an anemometer may determine air pressure.

Although the overprint system 500 has been described herein in the context of the labels 110, the overprint system 500 and the overprint orientation system 510 may be used with any type of substrate 100 or any type of printable or décor-able substance, i.e., able to be decorated. For example, the substrate 100 may include paperboard and the like that typically may be used for conventional containers, boxes, and the like. The substrate 100 may be made out of any type of material in any size, shape, or configuration. Moreover, the overprint orientation system 510 may be used to monitor any type of overprinting or any type of alignment.

Figure 9:
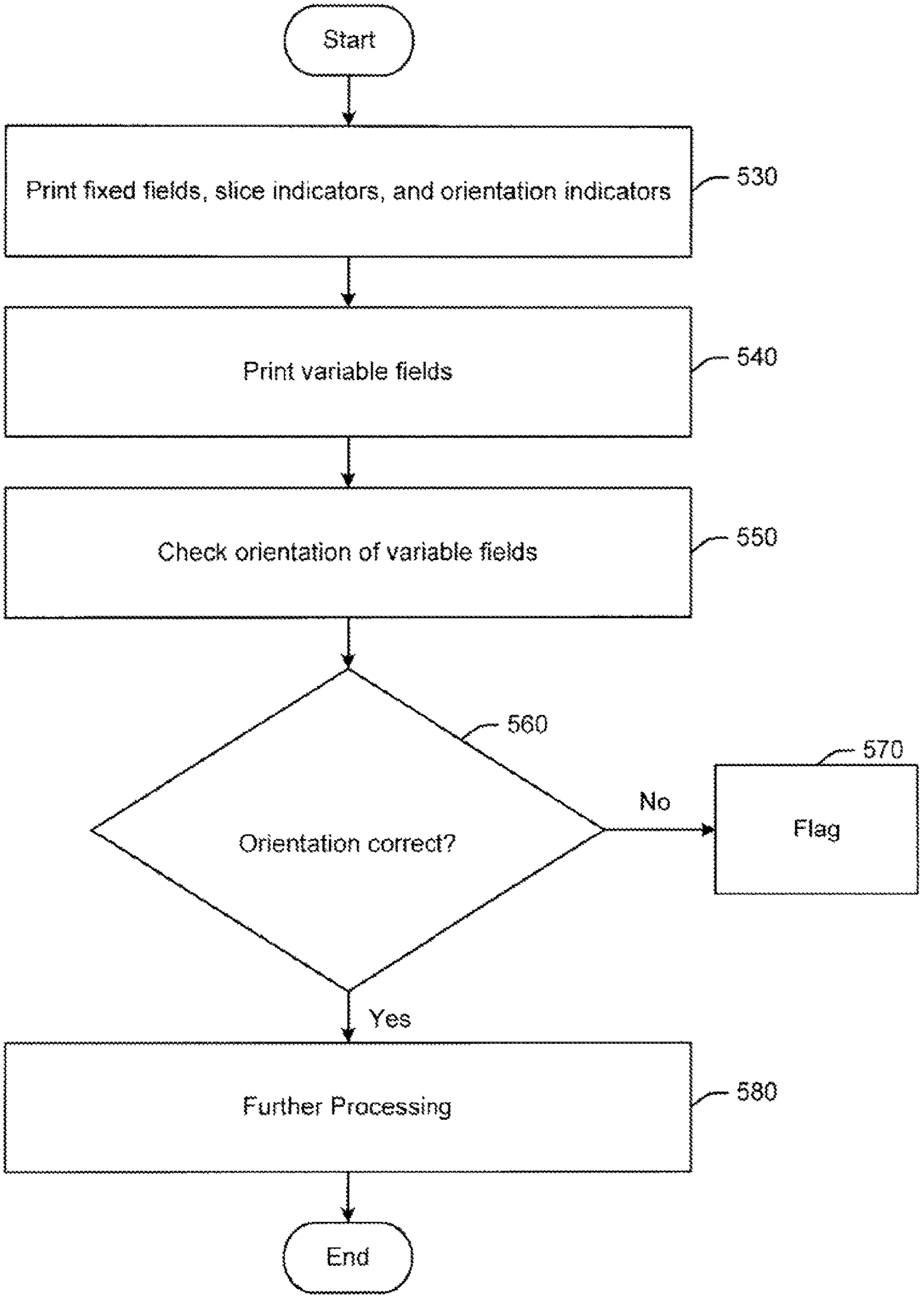
FIG. 9 is a flowchart showing examples of the labeling and monitoring steps described herein.

FIG. 9 is a flow chart showing examples of the method steps used herein to ensure the proper orientation of the digital overprint ink layer 160. At step 530, the conventional ink layer 140 may be printed on any type of substrate or base layer.

Specifically, the fixed fields 180, the slice indicator 230, and the orientation indicators 440 may be applied. At step 540, the digital overprint layer 160 may be applied as the variable field 210. At step 550, the orientation of the digital overprint ink layer 160 may be checked. At step 560, if the orientation indicators 440 are visible via the overprint orientation system 510 and the orientation sensors 520 thereof, the orientation is incorrect. At step 570, the misaligned label 480 thus may be flagged or other action may be taken. At step 580, if the orientation is correct, the label 400 may be forwarded for further processing such as cutting and gluing as is described above. Other steps and other actions may be taken herein in any order.

The overprint system 500 described above works well the application of darker digital overprint ink layers 160. For example, the application of red or black in a label for a Coca-Cola® brand soft drink bottle label. Other types of brands, however, may use lighter colors such as a Diet Coke® brand soft drink bottle label. The Diet Coke® brand soft drink bottle label may use a silver background. Similarly, it may be desirable to use a semi-variable field instead of the blank field 430 and the variable field 210. For example, colors and/or graphics could be applied by the conventional mechanical printer 280 and further colors and/or graphics could be added via the digital printer 310 in any field.

FIGS. 10-13 show a further embodiment of an overprint label 600 as may be described herein. In this example, the overprint label 600 may include any number of fixed fields 190, 200 and variable fields 210 or otherwise. In this example, the label 600 also may include a semi-variable field 610. The semi-variable field 610 may include a conventional ink layer 140 applied by the mechanical printer 280. For example, the semi-variable field 610 may include the silver color of the Diet Coke® brand soft drink bottle label with graphics such as "Share a Diet Coke With__________." A digital overlap ink layer 160 then may be applied by the digital printer 310. For example, the digital printer 310 may add a name to the semi-variable field 610. The final overprint label 600 thus may have the semi-variable field 610 with a silver background and graphics that state "Share a Diet Coke With Noel." Other components and other configurations also may be used herein.

The lack of a blank field 430, however, may limit the positioning of the orientation indicators 440. In this example, the overprint label 600 therefor may use one or more overlap area orientation indicators 620. The overlap area orientation indicator 620 may be printed in the conventional ink layer 140 with the conventional mechanical printer 280. The conventional ink layer 140 may include the optical brightener 240. The overlap area orientation indicator 620 may be printed in the overlap area 220 adjacent to the slice indicator 230 or elsewhere. The size of the overlap area orientation indicator 620 may vary with the size of the associated orientation sensor 520 or otherwise. The overlap area orientation indicator 620 may use lighter colors although any color may be used herein. Other components and other configurations may be used herein.

The overprint label 600 also may include an eye mark 630. The eye mark 630 may be printed in the digital overprint ink layer 160 with the digital printer 310. The eye mark 630 may be intended to be printed on top of the overlap area orientation indicator 620 in the overlap area 220. The eye mark 630 may be slightly larger in size as compared to the overlap area orientation indicator 620. For example, if the overlap area orientation indicator 620 is about one millimeter by three millimeters, the eye mark 630 may be about three millimeters by four millimeters. Other dimensions may be used herein. The eye mark 630 may use darker colors (at least compared to the overlap area orientation indicator 620) although any color may be used herein. Other components and other configurations may be used herein.

Figure 10:
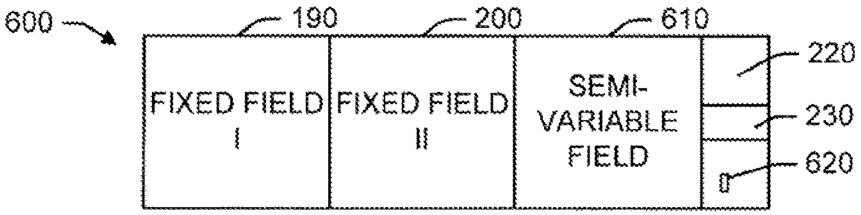
FIG. 10 is an illustration of an overprinted label with an overlap area orientation indicator.
Figure 11:
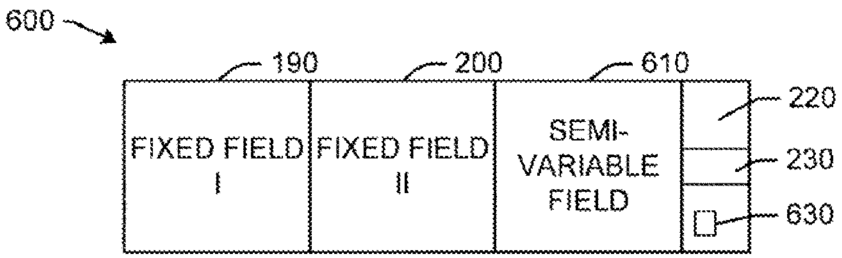
FIG. 11 is an illustration of an aligned overprinted label with an overlap area orientation indicator.
Figure 12:
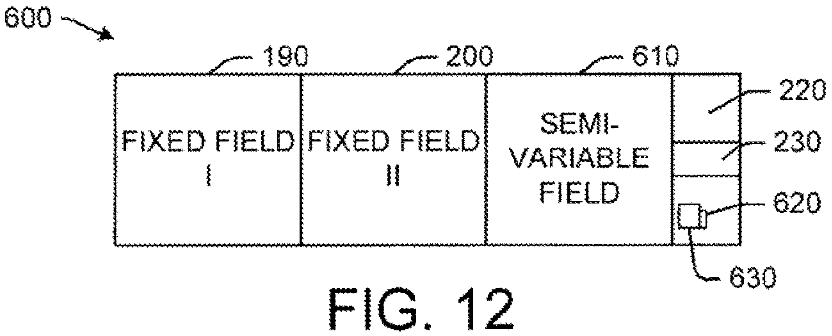
FIG. 12 is an illustration of a misaligned overprinted label with an overlap area orientation indicator.

In use, the overlap area orientation indicator 620 may be applied to the overlap area 220 by the conventional mechanical printer 280 as is shown in FIG. 10. The eye mark 630 then may be applied by the digital printer 310. If the overprint label 600 is in proper alignment, the overlap area orientation indicator 620 will be complete covered by the eye mark 630 as is shown in FIG. 11. If the overprint label 600 is out of alignment, part or all of the overlap area orientation indicator 620 will be visible.

A visible overlap area orientation indicator 620 thus may act as a trigger for the orientation sensor 520 while the eye mark 630 may act as a blocker. Detection of the overlap area orientation indicator 620 by the orientation sensor 520 thus will cause the overprint orientation system 510 to alert the operator that the digital overprint ink layer 160 is out of orientation. The operator then may pause, hold, stop, or modify the production run so as to bring the overprint labels 600 back into proper orientation. The lack of detection of the overlap area orientation indicator 620 thus indicates a properly oriented overprint label 600.

The overlap area orientation indicators 620 may be used across a continuous web 410 of the overprint labels 600. The use of the multiple overlap area orientation indicators 620 thus may detect any type of skew in the continuous web 410 from the top to the bottom or otherwise. Any number of the overlap area orientation indicators 620 may be used herein with any number of orientation sensors 520.

Figure 13:
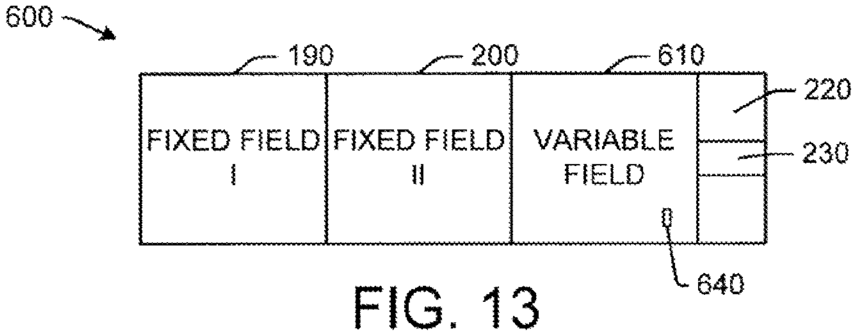
FIG. 13 is an illustration of an overprinted label with an orientation trigger.

In addition to the overlap area 220, the overlap area orientation indicators 620 also may server as orientation triggers 640 anywhere along the overprint label 600. As is shown in FIG. 13, such an orientation trigger 640 may be positioned in the variable field 210 or elsewhere for use with the eye mark 630. Other components and other configurations also may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. An overprint orientation system, comprising:

a mechanical printer for printing at a first speed on a substrate a first field and one or more orientation indicators within a second field;

a digital printer for overprinting the second field at a second speed; and an orientation sensor;

the orientation sensor determining whether the one or more orientation indicators are visible.

2. The overprint orientation system of claim 1, wherein the substrate comprises a label.

3. The overprint orientation system of claim 1, wherein the first field comprises a fixed field.

4. The overprint orientation system of claim 1, wherein the second field comprises a variable field or a semi-variable field.

5. The overprint orientation system of claim 1, wherein the one or more orientation indicators comprise an optical brightener.

6. The overprint orientation system of claim 1, wherein the one or more orientation indicators comprise a leading edge indicator and a trailing edge indicator.

7. The overprint orientation system of claim 1, wherein the one or more orientation indicators comprise an overlap area orientation indicator.

8. The overprint orientation system of claim 1, wherein the one or more orientation indicators comprise a trigger indicator.

9. The overprint orientation system of claim 1, wherein the mechanical printer prints a first ink layer.

10. The overprint orientation system of claim 1, wherein the digital printer prints an overprint ink layer.

11. The overprint orientation system of claim 10, wherein the overprint ink layer comprises an eye mark or a blocker.

12. The overprint orientation system of claim 1, wherein the orientation sensor comprises an optical sensor, a registration sensor, a contrast sensor, a luminescence sensor, a color sensor, or an array sensor.

13. The overprint orientation system of claim 1, further comprising a slice sensor and wherein the mechanical printer prints the slice indictor on the substrate.

14. A method of monitoring orientation of an overprint on a substrate, comprising:

mechanically printing a fixed field on the substrate at a first speed;

mechanically printing one or more orientation indicators in a blank field on the substrate at the first speed;

digitally overprinting the blank field at a second speed; and determining if the one or more orientation indicators are visible.

15. The method of monitoring overprint orientation of claim 14, wherein the step of printing one or more orientation indicators comprises printing an optical brightener.

16. The method of monitoring overprint orientation of claim 14, wherein the step of determining if the one or more orientation indicators are visible comprises optically sensing the blank field with an orientation sensor.

17. The method of monitoring overprint orientation of claim 14, further comprising the step of further processing the substrate if the one or more orientation indicators are not visible.

18. The method of monitoring overprint orientation of claim 14, further comprising the step of flagging the substrate as misaligned if the one or more orientation indicators are visible.

19. An overprint orientation system for printing on a film or a printable or décor-able substance, comprising:

a mechanical printer for printing at a first speed a fixed field and one or more orientation indicators within a blank field;

a digital printer for overprinting at a second speed the blank field to create a variable field; and an orientation sensor;

the orientation sensor determining whether the one or more orientation indicators are visible such that a misaligned variable field may be determined.

20. An overprint label, comprising:

a plurality of fields;

an overlap area adjacent to the plurality of fields;

a first ink printed on a first field;

an orientation indicator printed in the overlap area in the first ink;

a second ink printed on the first field; and an eye mark printed in the overlap area in the second ink;

wherein the first ink and the second ink are properly aligned if the orientation indicator is not visible.

* * * * *